United States Patent
Okabe

(10) Patent No.: US 10,547,579 B2
(45) Date of Patent: Jan. 28, 2020

(54) SYSTEM, CLIENT APPARATUS, SERVER APPARATUS, INFORMATION PROCESSING METHOD, AND COMPUTER-READABLE STORAGE MEDIUM FOR EMAIL TRANSMISSION

(71) Applicant: CANON KABUSHIKI KAISHA, Tokyo (JP)

(72) Inventor: Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 15/482,402

(22) Filed: Apr. 7, 2017

(65) Prior Publication Data
US 2017/0302602 A1    Oct. 19, 2017

(30) Foreign Application Priority Data
Apr. 13, 2016 (JP) .................... 2016-080418

(51) Int. Cl.
*H04L 12/58* (2006.01)

(52) U.S. Cl.
CPC .................. *H04L 51/08* (2013.01)

(58) Field of Classification Search
CPC ................ H04L 51/08; H04L 51/18
See application file for complete search history.

(56) References Cited

U.S. PATENT DOCUMENTS

| | | | | |
|---|---|---|---|---|
| 2010/0306330 | A1* | 12/2010 | Friedman | G06Q 10/107 709/206 |
| 2012/0023180 | A1* | 1/2012 | Fukuoka | G06Q 10/10 709/206 |
| 2016/0094499 | A1* | 3/2016 | Uraizee | G06F 16/168 715/752 |

FOREIGN PATENT DOCUMENTS

JP    2009182783 A    8/2009

* cited by examiner

*Primary Examiner* — Wing F Chan
*Assistant Examiner* — Billy H Ng
(74) *Attorney, Agent, or Firm* — Canon U.S.A., Inc. I.P. Division

(57) ABSTRACT

A client apparatus transmits to a server apparatus email information including destination email addresses of an email and information about a first file selected as a file to be attached, receives from the server apparatus at least one storage destination which is accessible to all users corresponding to the destination email addresses and in which a second file relating to the first file is stored as at least one storage destination candidate for the first file, displays the received storage destination candidate on a display, stores the first file in a storage destination corresponding to a storage destination candidate selected by a user from the displayed at least one storage destination candidate, and transmits to the destination email addresses an email including a link to the stored first file.

11 Claims, 9 Drawing Sheets

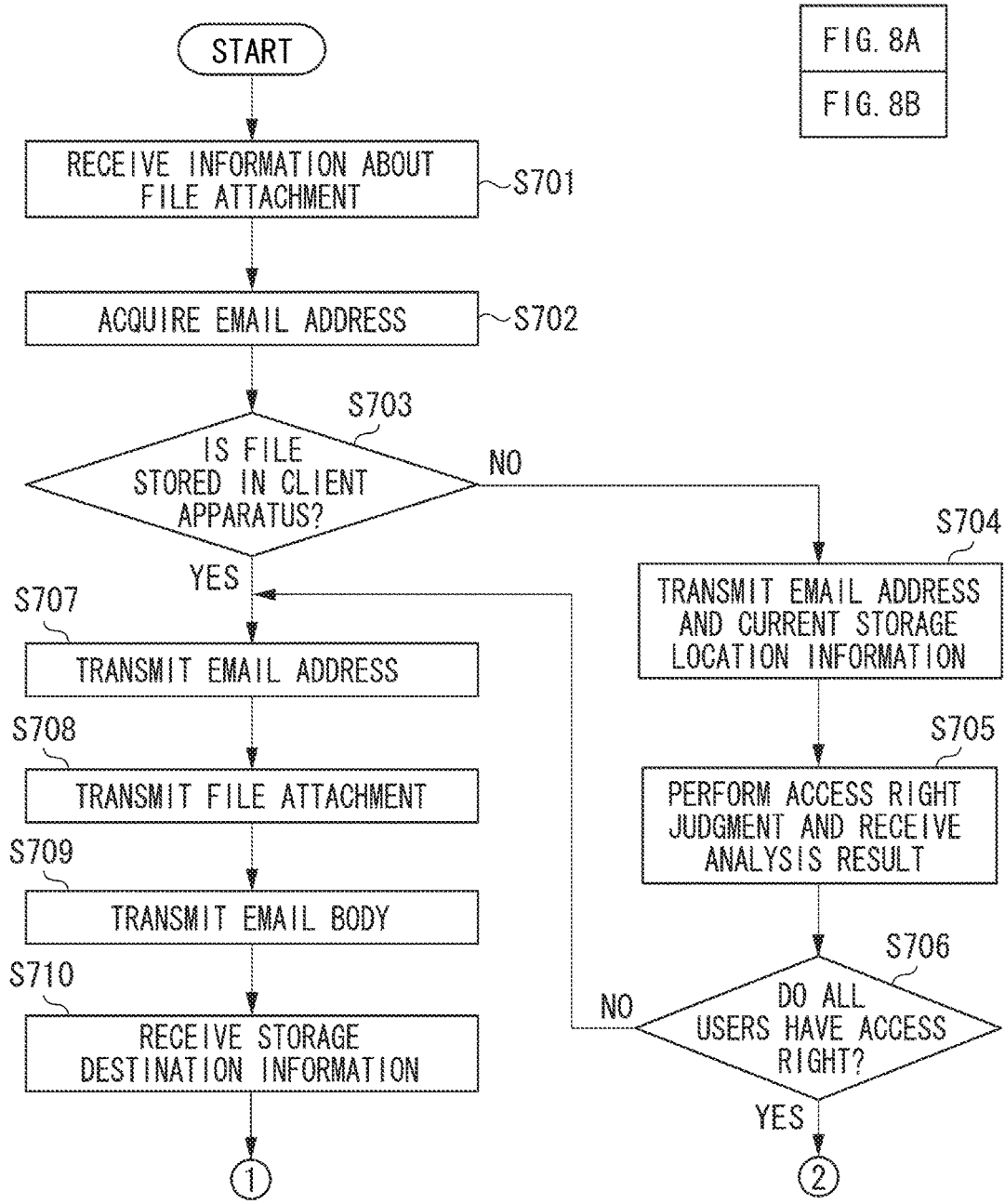

SYSTEM, CLIENT APPARATUS, SERVER APPARATUS, INFORMATION PROCESSING METHOD, AND COMPUTER-READABLE STORAGE MEDIUM FOR EMAIL TRANSMISSION

BACKGROUND

Field

The present disclosure relates to a system and method for selecting a suitable storage destination of a file attachment in email transmission.

Description of the Related Art

Attaching a file to an electronic mail (hereinafter, "email") and then transmitting the email with the file attachment is a way of sharing the file with other persons. This method enables convenient transmission of the file to recipients but has a problem that transmission or reception of a larger-size file takes a longer time or may cause an error on an email server side. Further, the file is copied and the copy is transmitted in the method, so the method is not suitable for a case in which one file is to be edited by a plurality of email recipients.

Another possible method is a method in which a file is stored in a shared folder accessible to a plurality of persons, and then an email including a path or shortcut to the shared folder is transmitted. In this method, a sender of the email needs to store the file in a suitable location and consider whether every recipient of the email is accessible to the location in which the file is stored.

Japanese Patent Application Laid-Open No. 2009-182783 discusses a method in which an email relay apparatus stores a file attached to an email in a file server, deletes the attached file from the email, and sets an access right to allow each recipient of the email to access the file. In this method, a plurality of email recipients can edit the single file by accessing the file stored in the file server.

Meanwhile, there can be a demand for collectively storing a plurality of related files in a single shared folder when a plurality of persons cooperates together on a project, etc. However, in the method discussed in Japanese Patent Application Laid-Open No. 2009-182783, each time a file is transmitted via an email, a new storage location is generated to store the file therein. Therefore, the method is not applicable to a case in which a file is to be stored in an existing shared folder and to be shared. Specifically, when a file is to be stored and shared in an existing location which is suitable for the contents of the file and is accessible to every email recipient, an email sender is required to search for such an existing file storage location (folder) and store the file in the folder.

SUMMARY

According to an aspect of the present disclosure, a system comprises a client apparatus and a first server apparatus. The client apparatus includes a first memory storing a first program, and a first processor in communication with the first memory, wherein the first processor executes the first program to perform transmitting to the first server apparatus email information including destination email addresses of an email and information about a first file selected as a file to be attached, receiving from the first server apparatus at least one storage destination candidate for the first file, displaying the received at least one storage destination candidate on a display, storing the first file in a storage destination corresponding to a storage destination candidate selected by a user from the displayed at least one storage destination candidate, and transmitting to the email addresses an email including a link to the stored first file. The first server apparatus includes a second memory storing a second program, and a second processor in communication with the second memory, wherein the second processor executes the second program to perform receiving the email information from the client apparatus, determining, based on the received email information, at least one storage destination which is accessible to all users corresponding to the destination email addresses and in which a second file relating to the first file is stored, as the at least one storage destination candidate for the first file, and transmitting to the client apparatus the determined at least one storage destination candidate for the first file.

According to another aspect of the present disclosure, a storage destination (folder) which is accessible to every email recipient and is suitable for the contents of a file can be selected with ease.

Further features of the present disclosure will become apparent from the following description of example embodiments with reference to the attached drawings.

DESCRIPTION OF THE EMBODIMENTS

Various example embodiments will be described below with reference to the drawings.

The following describes a first example embodiment with reference to FIGS. 1 to 7.

Figure 1:
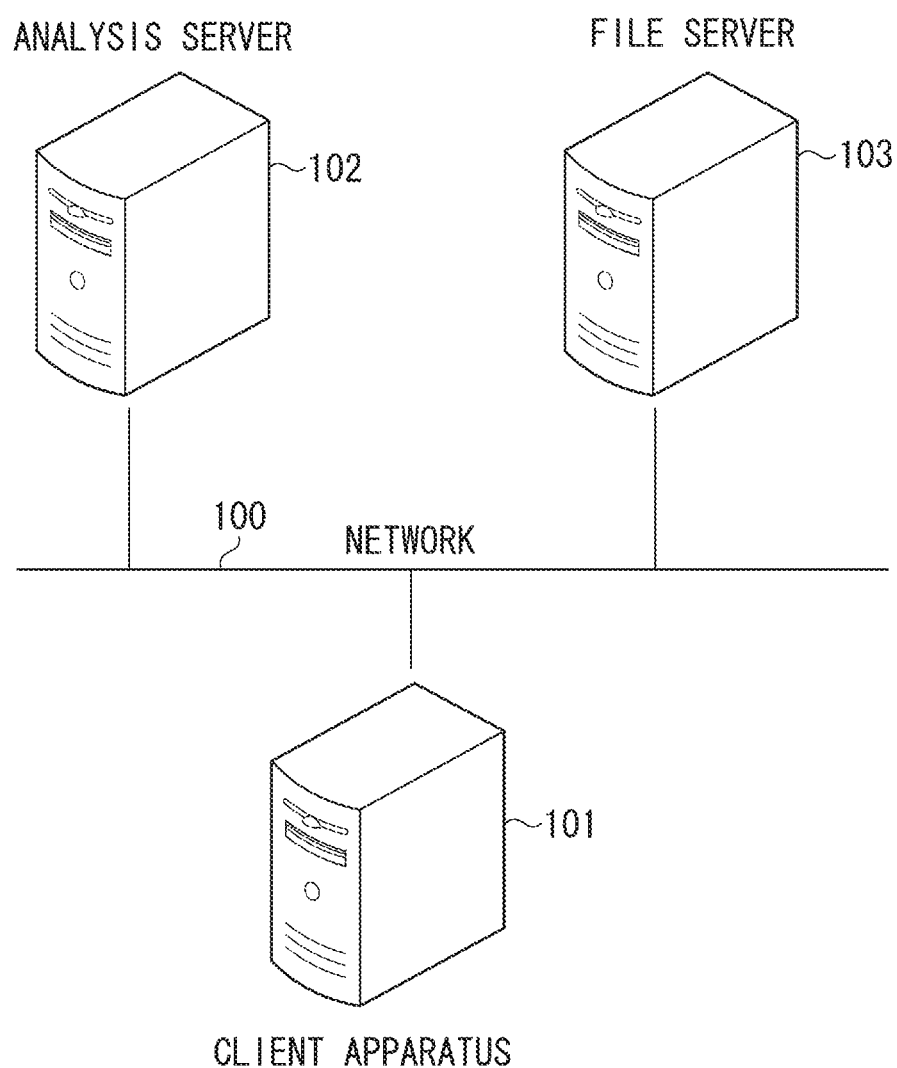
FIG. 1 illustrates an example of a system configuration of a file system.

FIG. 1 illustrates an example of a system configuration of a file system. The system includes a client apparatus 101, an analysis server 102, and a file server 103, which are connected one another via a network 100. The network 100 is an infrastructure for communication between the client apparatus 101, the analysis server 102, and the file server 103 and can be an intranet, the Internet, or any other network system.

The client apparatus 101 is a personal computer (PC), and a mailer for email transmission and reception runs on the client apparatus 101. Further, the client apparatus 101 performs browsing and editing of various files and stores the files in the file server 103 via the network 100.

The analysis server 102 has a function of acquiring a file stored in the file server 103, extracting text from the acquired file, and storing the extracted text on a database (hereinafter, "DB"). Further, the analysis server 102 also has a function of comparing the information stored in the DB with text extracted from electronic data to be compared, and making a list of candidates for a storage destination of a file similar to the electronic data.

The file server 103 has a function of managing and storing files in a hierarchical structure such as folders. The file server 103 can be a plurality of file servers. Further, the file server 103 can be an online storage service which manages files on the Internet.

Figure 2:
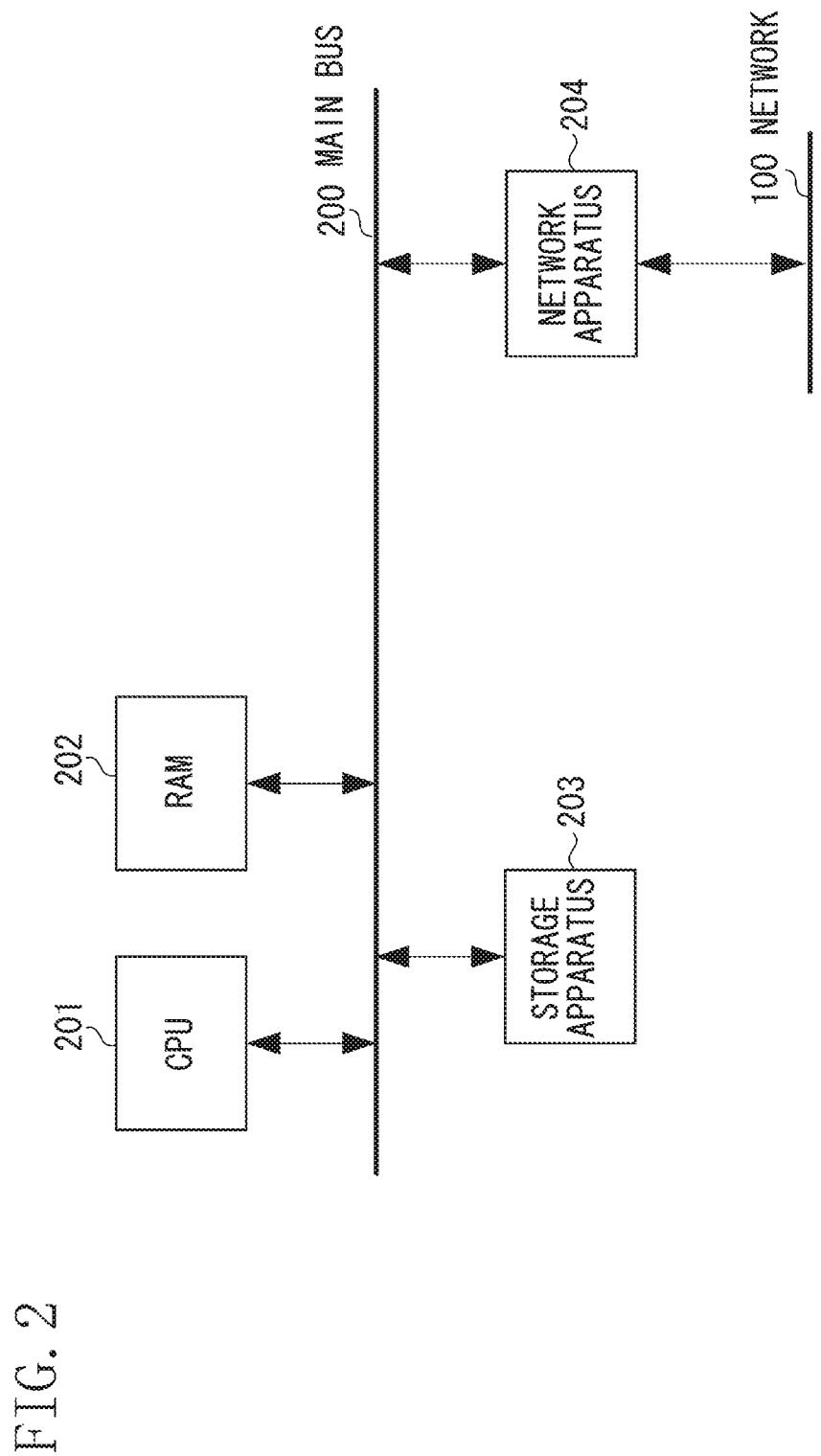
FIG. 2 illustrates an example of a hardware configuration of a client apparatus, etc.

FIG. 2 illustrates an example of a hardware configuration of each of the client apparatus 101, the analysis server 102, and the file server 103. A central processing unit (CPU) 201 controls the entire apparatus. A random access memory (RAM) 202 provides a work area of the CPU 201. A storage apparatus 203 stores programs, settings information, etc. A network apparatus 204 communicates with other apparatuses via the network 100. A main bus 200 connects the apparatuses. In the present example embodiment, unless otherwise specified, the CPU 201 controls the RAM 202, the storage apparatus 203, and the network apparatus 204 via the main bus 200.

The CPU of the analysis server 102 executes processing according to a program stored in the storage apparatus of the analysis server 102 to realize a below-described software configuration of the analysis server 102 illustrated in FIG. 3, a process illustrated in a flowchart in FIG. 7, etc.

Further, the CPU of the client apparatus 101 executes processing according to a program stored in the storage apparatus of the client apparatus 101 to realize a below-described software configuration of the client apparatus 101 illustrated in FIG. 4, processes illustrated in flowcharts in FIGS. 6 and 8, etc.

Furthermore, the CPU of the file server 103 executes processing according to a program stored in the storage apparatus of the file server 103 to realize a below-described software configuration of the file server 103 illustrated in FIG. 5, etc. The hardware configuration of the client apparatus 101 can further include a display apparatus such as a display, an input apparatus such as a keyboard and a mouse in addition to the configuration illustrated in FIG. 2.

Figure 3:
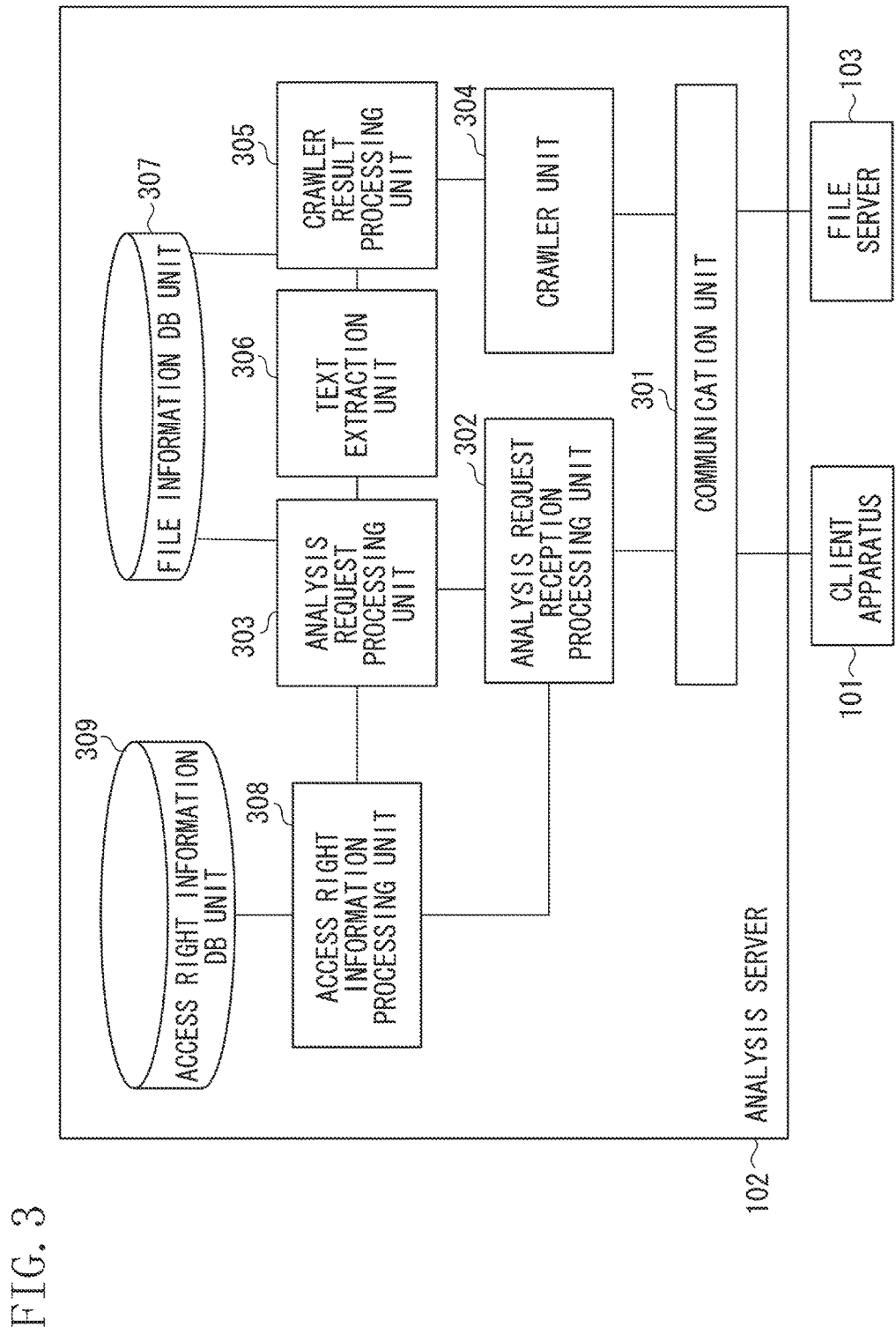
FIG. 3 illustrates an example of a software configuration of an analysis server.

FIG. 3 illustrates an example of a software configuration of the analysis server 102. The analysis server 102 includes a communication unit 301, an analysis request reception processing unit 302, an analysis request processing unit 303, a crawler unit 304, a crawler result processing unit 305, a text extraction unit 306, a file information DB unit 307, an access right information processing unit 308, and an access right information DB unit 309.

The crawler unit 304 collects via the communication unit 301 files stored in the file server 103 and storage destination information about the files (i.e., information about a hierarchical structure such as folders in which the files are stored). The crawler unit 304 collects a new or updated file. The crawler unit 304 does not collect a file that has been already collected.

The crawler unit 304 passes the collected file and collected storage destination information to the crawler result processing unit 305. The crawler result processing unit 305 passes the file received from the crawler unit 304 to the text extraction unit 306, and receives as a response a text extraction result extracted from the file. Then, the crawler result processing unit 305 stores the text extraction result received from the text extraction unit 306 and the collected storage destination information in association with each other in the file information DB unit 307.

Meanwhile, the analysis request reception processing unit 302 receives a file analysis request from the client apparatus 101 via the communication unit 301. The analysis request reception processing unit 302 also performs processing to transmit as a response to the client apparatus 101 an analysis result processed by the analysis request processing unit 303, which will be described below. Further, the analysis request reception processing unit 302 also receives email body information from the client apparatus 101 and transmits the email body information to the analysis request processing unit 303 as the analysis request reception processing unit 302 transmits the file. The email body information is transmitted in a form that indicates it is the email body.

The analysis request processing unit 303 passes the file received by the analysis request reception processing unit 302 to the text extraction unit 306, and receives as a response the text extraction result extracted from the file. At the same time, the analysis request processing unit 303 acquires stored file information from the file information DB unit 307, and performs processing to compare the acquired file information with the text extraction result received from the text extraction unit 306. After performing the comparison, the analysis request processing unit 303 passes as an analysis result to the analysis request reception processing unit 302 storage destination information about a storage destination in which a similar file to the file received by the analysis request reception processing unit 302 is stored. If the analysis request reception processing unit 302 further passes the email body to the analysis request processing unit 303, the analysis request processing unit 303 determines the email body as different text information from the file and changes (e.g., decreases) a weighting and searches for storage destination information. Specifically, the analysis request processing unit 303 acquires from the file information DB unit 307 file information about files stored in the respective folders in the file server 103, compares the acquired file information with the text information about the email body and the text information extracted from the files, and gives weightings to the comparison results to acquire a final comparison result. Based on the final comparison result, a search can be performed for a folder (storage destination information) in the file server 103 in which many files relating (or similar) to the text information extracted from the files and the text information about the email body have been already stored. When a low weighting is set to the email body, an effect on the search for the storage destination information is small. For example, if the phrase "XXX proposal" appears frequently in the email body to which the low weighting is set, while the phrase appears infrequently in a file to which a high weighting is set, the effect of the phrase "XXX proposal" on the storage destination search result is small. Specifically, even if the phrase "XXX proposal" appears frequently in the email body to which the low weighting is set, the order of a storage destination including a file relating to the phrase "XXX proposal" on a list of the search result is low, if the phrase appears infrequently in the file to which the high weighting is set. The value of the weighting can be set changeable by a user. In this case, if the weighting of the email body is set to zero, information about the email body has no effect on the search for the storage destination information. Further, the analysis request processing unit 303 filters the storage destination information using below-described information passed from the access right information processing unit 308.

The text extraction unit 306 performs processing to extract the text information from the files. Further, the text extraction unit 306 also performs processing to segment the extracted text into paragraphs as appropriate and count the number of times of appearance of a keyword.

The access right information processing unit 308 registers in the access right information DB unit 309 an access right of each user with respect to the file server 103. The access right information processing unit 308 searches the access right information DB unit 309 based on the email address passed from the client apparatus 101 to acquire a location which is accessible to the user of the email address. Further, when the email address and the storage destination information about the files are passed from the client apparatus 101 to the access right information processing unit 308, the access right information processing unit 308 checks whether the user of the email address is accessible to the storage destinations. The access right information processing unit 308 periodically receives access right information from the file server 103 or a server or the like that manages the access rights with respect to the file server 103. Alternatively, when registering a file in the file server 103, the client apparatus 101 can notify the access right information processing unit 308 that the location is accessible.

The access right information DB unit 309 stores access right information about each user with respect to the file server 103 (a plurality of file servers 103 can exist). Examples of a basis for setting an access right include a file server basis, hierarchical structure basis, and file basis. To simplify the description, the hierarchical structure basis will be described as an example in the present example embodiment. The access right information DB unit 309 stores a user in association with an email address. An example of access right management is described below.

TABLE 1

Access Right Management Table

| User ID | File Server | Path | Access Right |
|---------|-------------|-----------|--------------|
| A05812  | F1505       | aaa/bbb/ccc | R/W        |
| A12183  | F0910       | xxx/yyy   | R            |
| A12183  | F0910       | mmm/nnn   | R/W          |
| A02984  | F1208       | aaa/bbb   | R            |
| A02984  | F1208       | aaa/bbb/ccc | R/W        |

TABLE 2

Email Address Management Table

| USER ID | EMAIL ADDRESS |
|---------|---------------|
| A05812  | tanaka@aaa.com |
| A12183  | suzuki@aaa.com |
| A02984  | sato@aaa.com  |
| A00423  | yoshida@aaa.com |

Table 1 is a table which defines for each user identification (ID) an access right with respect to a file storage location in the file server 103. The user ID is a unique value throughout the entire file system illustrated in FIG. 1. Alternatively, a user ID can be held for each file server 103 while another user ID is defined in the analysis server 102, and a mapping between the user IDs can be held. The column "Path" is a column indicating a path to which an access right is to be given or not given, i.e., a column indicating a hierarchical structure. The hierarchical structure indicated by the path can, but does not have to, include up to the file. The access right can be inherited to a path below a designated path. The column "Access Right" indicates a type such as "Read" and "Write".

A combination of a user, file server, and path that is not registered in the table has no access right (has even no reading right). Inversely, the access right type can be indicated in a form in which a user cannot access a specific path but can access all other paths.

Table 2 is a table in which the respective user IDs associate with the email addresses. This information is registered in advance. Alternatively, the information can be synchronized from another server that manages the users, or an inquiry can be transmitted to the server.

Figure 4:
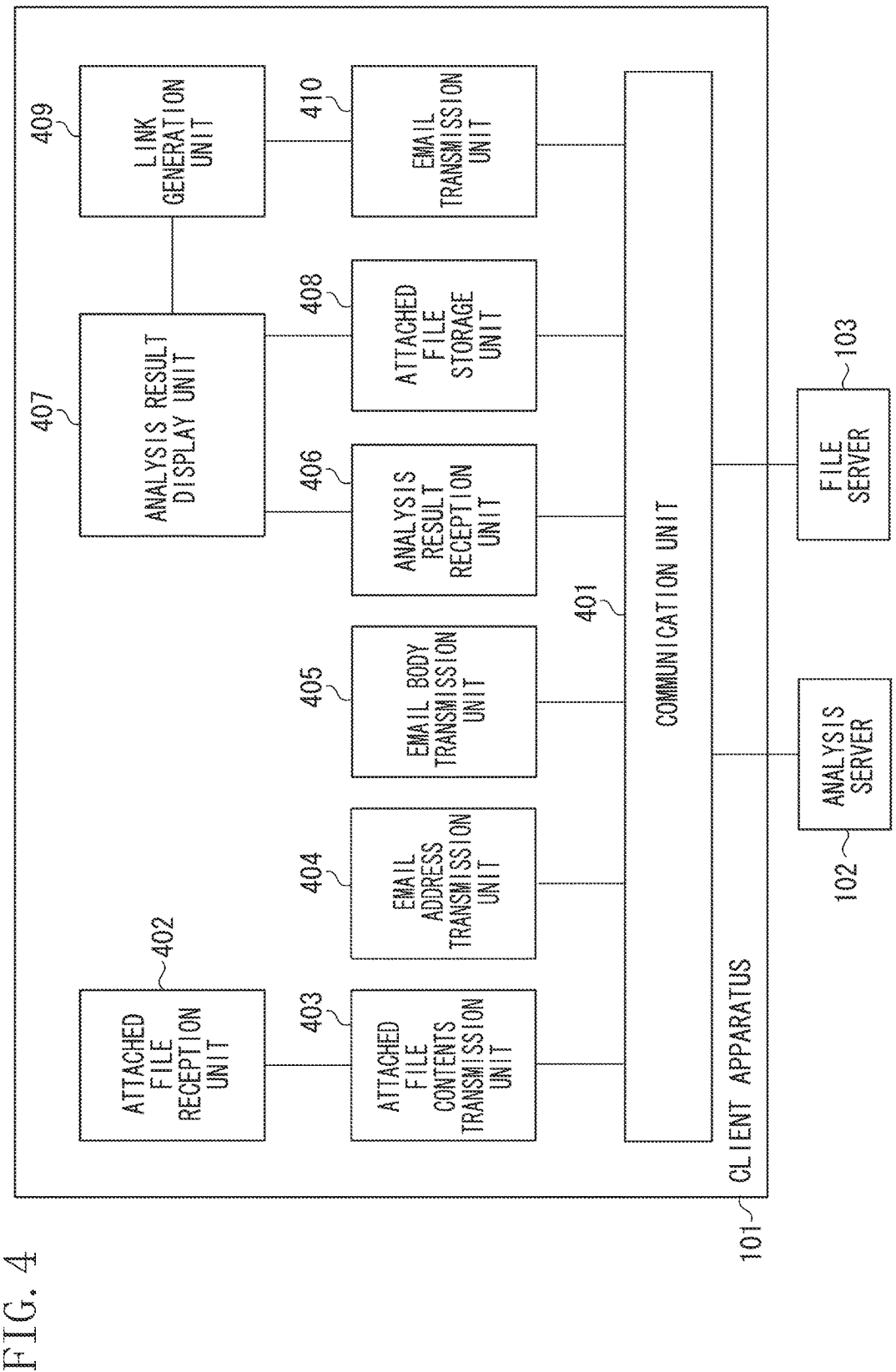
FIG. 4 illustrates an example of a software configuration of a client apparatus.

FIG. 4 illustrates an example of a software configuration of a mailer or a mailer plugin which runs on the client apparatus 101. The software configuration of the client apparatus 101 includes a communication unit 401, an attached file reception unit 402, an attached file contents transmission unit 403, an email address transmission unit 404, an email body transmission unit 405, an analysis result reception unit 406, and an analysis result display unit 407. The software configuration of the client apparatus 101 further includes an attached file storage unit 408, a link generation unit 409, and an email transmission unit 410.

The attached file reception unit 402 receives an instruction to specify a file that is specified as a file to be attached by the user. Further, the attached file reception unit 402 determines whether a current storage location of the file is in the client apparatus 101 or the file server 103. The attached file contents transmission unit 403 transmits information about the file specified by the attached file reception unit 402 to the analysis server 102 via the communication unit 401. In a case where the file to be attached is in the file server 103, the attached file contents transmission unit 403 also transmits information about its storage location of the file.

The email address transmission unit 404 acquires a user-specified email destination, i.e., an email address of the destination, and transmits the acquired email address to the analysis server 102 via the communication unit 401. The email body transmission unit 405 acquires contents of the email body and transmits the acquired contents to the analysis server 102 via the communication unit 401.

The analysis result reception unit 406 receives the storage destination information (one or more storage destination candidates) transmitted from the analysis server 102. The storage destination information is described in a form of a list indicating a plurality of storage destination candidates listed in order of priority. The analysis result display unit 407 displays the storage destination information (the one or more storage destination candidates) received by the analysis result reception unit 406, and prompts the user to select a storage destination. The attached file storage unit 408 stores in the user-selected storage destination the file to be attached that is specified by the attached file reception unit 402. The link generation unit 409 generates a link to the file stored in the storage destination by the attached file storage unit 408 and describes the generated link in the email body. The link generation unit 409 can attach the link as a shortcut file to the email instead of describing the link in the email body. The email transmission unit 410 receives a user instruction to transmit the email and transmits the email.

Figure 5:
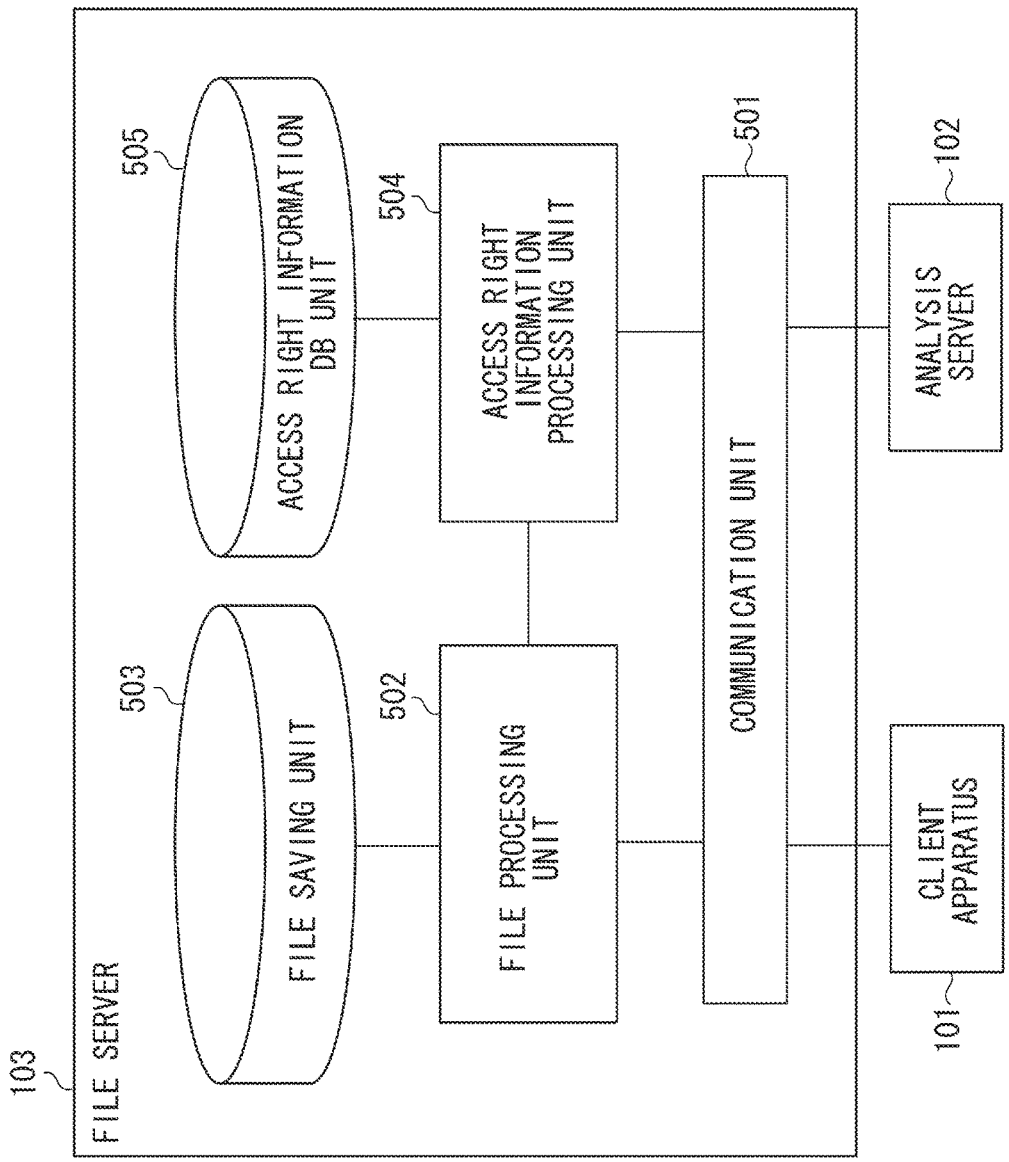
FIG. 5 illustrates an example of a software configuration of a file server.

FIG. 5 illustrates an example of a software configuration of the file server 103. The software configuration of the file server 103 includes a communication unit 501, a file processing unit 502, a file saving unit 503, an access right information processing unit 504, and an access right information DB unit 505.

The file processing unit 502 receives via the communication unit 501 a request from the client apparatus 101 or the analysis server 102. Types of the received request include a request for storing a file in the file saving unit 503 and a request for acquiring a file stored in the file saving unit 503. The file processing unit 502 stores the file in the file saving unit 503 or acquires the file according to the received request. Further, the file processing unit 502 controls access to the file saving unit 503 based on the information received from the access right information processing unit 504. The file saving unit 503 plays a role of holding an entity of the file according to an instruction from the file processing unit 502. The files are basically managed such that related files are collectively managed in the hierarchical structure.

The access right information processing unit 504 performs user authentication processing and determines for each user whether each file or location (folder) in the file saving unit 503 is accessible to the user. The access right information processing unit 504 passes a result of the determination to the file processing unit 502. Further, the access right information processing unit 504 transmits the access right information to the analysis server 102 via the communication unit 501. The access right information DB unit 505 stores the accessibility of each user to each file or location (folder) in the file saving unit 503. The processing performed by the access right information processing unit 504 and the processing performed by the access right information DB unit 505 can be executed on a different server (authentication server) from the file server 103.

Figure 6:
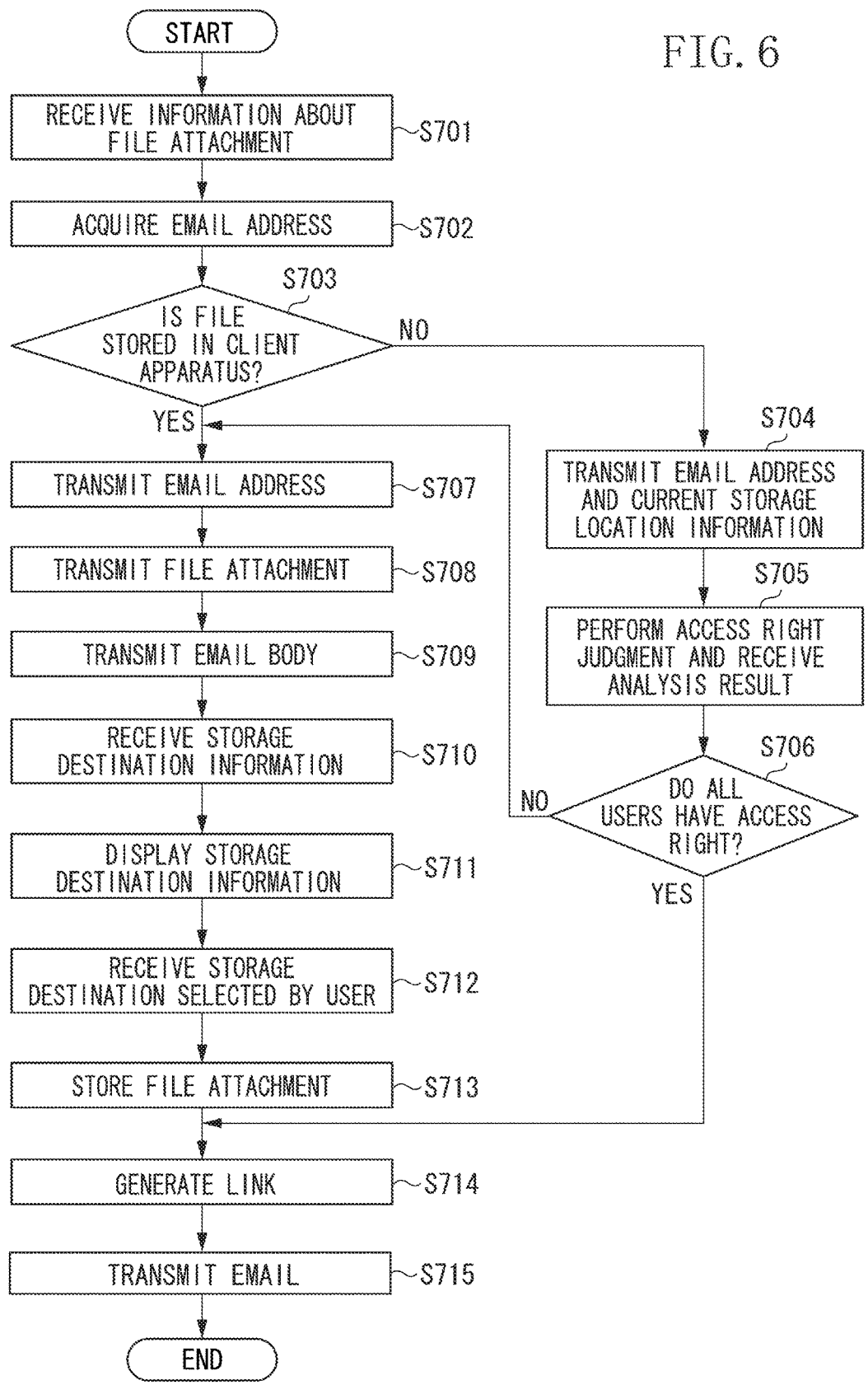
FIG. 6 is a flowchart illustrating an example of information processing which is performed by the client apparatus according to a first example embodiment.

FIG. 6 is a flowchart illustrating a process of information processing in attaching a file to an email by a user on the client apparatus 101.

In step S701, the attached file reception unit 402 receives information about a file attachment to be attached to the email according to user specification. In step S702, the email address transmission unit 404 acquires email addresses of user-specified transmission destinations.

In step S703, the attached file reception unit 402 checks a current storage location of the specified file attachment. If the current storage location is in the client apparatus 101 (client apparatus) (YES in step S703), the processing proceeds to step S707. On the other hand, if the current storage location of the file attachment is in the file server 103 (server apparatus) (NO in step S703), the processing proceeds to step S704.

In step S704, the email address transmission unit 404 and the attached file contents transmission unit 403 transmit the email addresses and the current storage location information about the file attachment to the analysis server 102. Then, in step S705, the analysis result reception unit 406 checks whether the current storage location of the file specified in step S701 is accessible to users of the email addresses acquired in step S702 (i.e., whether every user has an access right to access the storage location) and receives an analysis result from the analysis server 102. In step S706, the analysis result reception unit 406 judges whether all the users of the email addresses of the destinations acquired in step S702 can access the current storage location of the file based on the received analysis result. If the analysis result reception unit 406 judges that all the users of the email addresses acquired in step S702 can access the file (YES in step S706), the processing proceeds to step S714. On the other hand, if the analysis result reception unit 406 judges that not all the users of the email addresses acquired in step S702 can access the file (NO in step S706), the processing proceeds to step S707.

In step S707, the email address transmission unit 404 transmits the email addresses acquired in step S702 to the analysis server 102. In step S708, the attached file contents transmission unit 403 transmits the file received in step S701 to the analysis server 102. In step S709, the email body transmission unit 405 transmits to the analysis server 102 information about the body described in the email. The client apparatus 101 can transmit in one communication the information transmitted in step S707, the information transmitted in step S708, and the information transmitted in step S709. The processing of searching for a storage destination of a similar file in the analysis server 102 will be described below with reference to FIG. 7. The email addresses, the contents of the file attachment, and the contents of the email are examples of email information. In a case where the search is set to be performed without using the description contents of the email body (e.g., a case where the weighting of the email body is set to zero), the email body transmission processing in step S709 can be skipped.

In step S710, the analysis result reception unit 406 receives from the analysis server 102 storage destination information (one or more storage destination candidates) about a related file (similar file) which is an analysis result. In step S711, the analysis result display unit 407 displays the received storage destination information (one or more storage destination candidates) and prompts the user to select a desired storage destination from the displayed one or more storage destination candidates. When a list of storage destination candidates is displayed, the storage destination candidates are desirably displayed in descending order of scores of the result of comparison performed by the analysis server 102. In step S712, the analysis result display unit 407 receives a storage destination selected by the user. In step S713, the attached file storage unit 408 stores the file received in step S701 in the user-selected storage destination received in step S712.

In step S714, the link generation unit 409 generates a link to the file. In the case where the processing proceeds to step S714 via step S713, the link generation unit 409 generates a link to the file stored in step S713. On the other hand, in the case where the result of judgment in step S706 is "YES" and then the processing proceeds to step S714, the link generation unit 409 generates a link to the file (i.e., a link to the file which exists in the location where the file is stored when selected). In step S715, the email transmission unit 410 transmits the email including the link to the file according to a user instruction.

Figure 7:
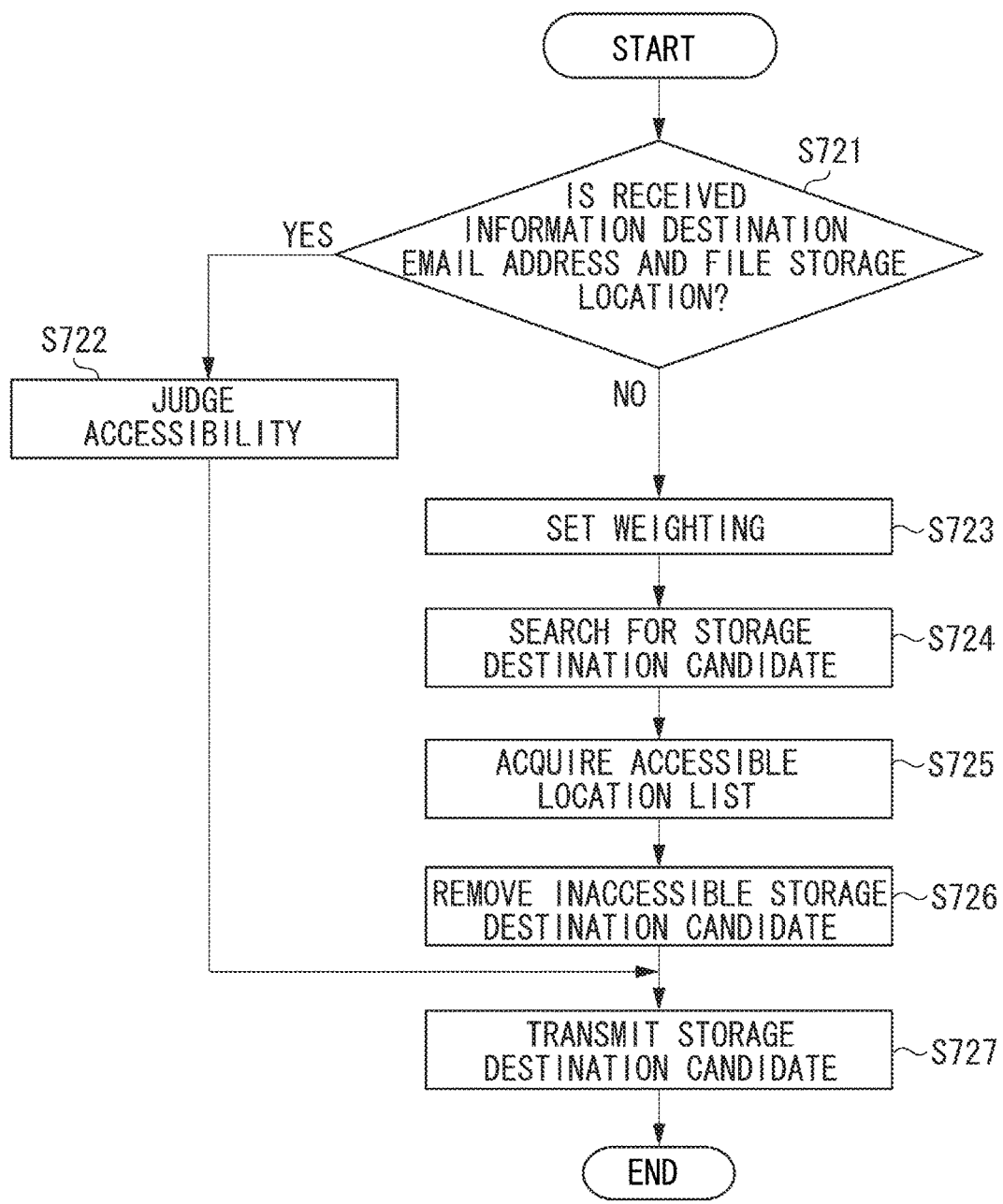
FIG. 7 is a flowchart illustrating an example of information processing which is performed by the analysis server.

FIG. 7 is a flowchart illustrating a process of information processing which is performed by the analysis server 102 when a request is received from the client apparatus 101.

In step S721, the analysis request reception processing unit 302 judges whether the information received from the client apparatus 101 is the destination email addresses and the file storage location (i.e., the received information is the information transmitted from the client apparatus 101 in step S704) or the destination email addresses, the file, and the email body (i.e., the received information is the information transmitted from the client apparatus 101 in steps S707 to S709). If the received information is the destination email addresses and the file storage location (YES in step S721), the processing proceeds to step S722. On the other hand, if the received information is the destination email addresses, the file, and the email body (NO in step S721), the processing proceeds to step S723.

In step S722, the access right information processing unit 308 transmits an inquiry to the access right information DB unit 309 to check whether the users of the received email addresses can access the file storage location. Then, the processing proceeds to step S727, and the access right information processing unit 308 transmits a result of the judgment as to whether the users of the respective email addresses can access the file storage location.

In step S723, the analysis request processing unit 303 sets a weighting for the search performed using the email body and the file. Then, in step S724, the analysis request processing unit 303 performs comparison with the file information (information about the files stored in the respective folders in the file server 103) acquired from the file information DB unit 307 using the contents of the file (text information extracted from the file) and the contents of the email body (text information included in the email body), and acquires storage destination information (storage destination candidate) about a folder in which many related or similar files are stored, as described above. Then, in step S725, the access right information processing unit 308 transmits an inquiry regarding the destination email addresses to the access right information DB unit 309 and acquires a list of locations which are accessible to the users of the destination email addresses. Then, in step S726, if the storage destination information acquired in step S724 includes a location other than the accessible locations acquired in step S725, the analysis request processing unit 303 removes the location other than the accessible locations. Then, the processing proceeds to step S727, and the analysis request reception processing unit 302 transmits to the client apparatus 101 a folder which is accessible to all the users of the destination email addresses and in which many files relating to the contents of the file to be attached and the contents of the email body are stored, as the storage destination information (storage destination candidate) of the search result.

The processing order of steps S724 to S726 in FIG. 7 is not limited to the above-described order, and the accessible location acquisition processing (step S725) can be performed first and then the storage destination information search processing (step S724) can be executed within the limited range of accessible locations.

The processing of steps S723 to S726 is an example of determination processing in which the folder which is accessible to all the users of the destination email addresses and in which many files relating to the contents of the file to be attached and the contents of the email body are stored is determined, as file attachment storage destination information (storage destination candidate).

The following describes a second example embodiment with reference to FIG. 8. In the second example embodiment, processing which is performed in a case where there is not even one location which is accessible to all the users of the specified destination email addresses will be described.

Figure 8B:
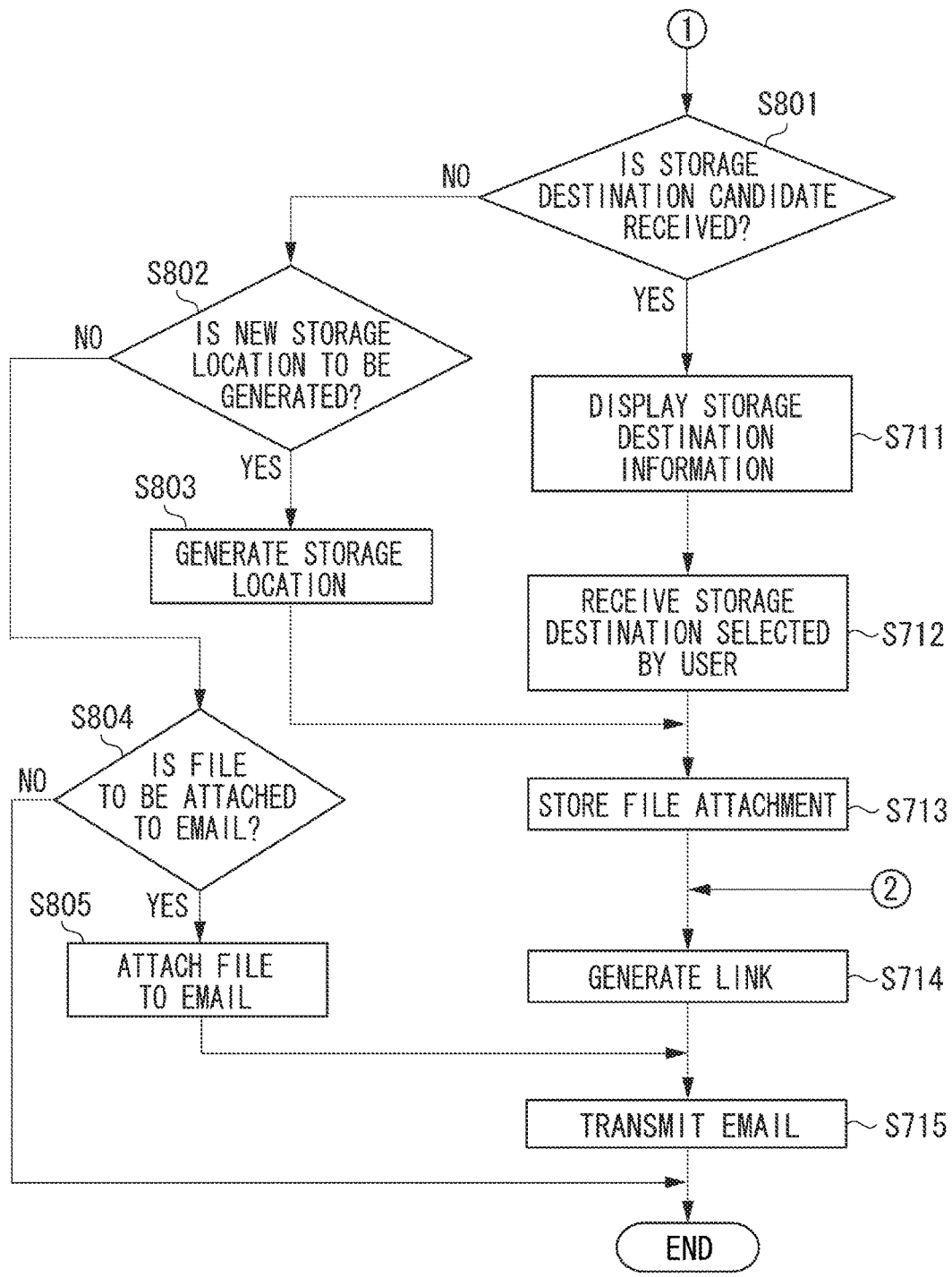
FIG. 8, composed of FIG. 8A and FIG. 8B, is a flowchart illustrating an example of information processing which is performed by the client apparatus according to a second example embodiment.

FIG. 8, composed of FIG. 8A and FIG. 8B, is a flowchart in which the processing which is performed in the case where there is not even one location which is accessible to all the users of the specified destination email addresses is added to the flowchart illustrated in FIG. 6. Different processing from FIG. 6 will be described below.

In step S801, the analysis result reception unit 406 judges whether the storage destination information (storage destination candidate) is received from the analysis server 102 (i.e., whether there is a file which is accessible to all the users of the specified destination email addresses and in which many files relating to the contents of the file to be attached and the contents of the email body are stored).

If the analysis result reception unit 406 judges that the storage destination information is received (if the analysis result reception unit 406 judges that there is a storage location which is accessible to all the users of the destination email addresses) (YES in step S801), the processing proceeds to step S711.

On the other hand, if the analysis result reception unit 406 judges that there is no storage destination information (storage destination candidate) (if the analysis result reception unit 406 judges that there is not a storage location which is accessible to all the users of the destination email addresses) (NO in step S801), the processing proceeds to step S802. In step S802, the analysis result display unit 407 asks the user whether to generate a new file attachment storage location (storage destination folder). For example, the analysis result display unit 407 displays on a display device of the client apparatus 101 a screen for asking the user whether to generate a new file attachment storage location. The user inputs as to whether to generate a new file attachment storage location via the input apparatus of the client apparatus 101 and the screen. If the analysis result display unit 407 judges that a new storage location is to be generated based on the input (YES in step S802), the processing proceeds to step S803. On the other hand, if the analysis result display unit 407 judges that a new storage location is not to be generated (NO in step S802), the processing proceeds to step S804.

In step S803, the attached file storage unit 408 transmits to the file server 103 a request for generating a storage location. The file processing unit 502 of the file server 103 receives the request and generates a location in which the file is to be stored. The new location to be generated can be a location which is accessible to any user who knows a path, a location which is accessible to only the users of the specified destination email addresses, or a location which is to be deleted after a predetermined period.

In step S804, the analysis result display unit 407 asks the user whether to attach the file to the email. For example, the analysis result display unit 407 displays on the display device of the client apparatus 101 a screen for asking the user whether to attach the file to the email. The user inputs as to whether to attach the file to the email via the input apparatus of the client apparatus 101 and the screen. If the analysis result display unit 407 judges that the file is to be attached to the email based on the input (YES in step S804), the processing proceeds to step S805. On the other hand, if the analysis result display unit 407 judges that the file is not to be attached to the email (NO in step S804), the process illustrated in FIG. 8 ends. In step S805, the email transmission unit 410 attaches the file to the email.

Other Embodiments

Embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The information processing according to each of the above-described example embodiments makes it possible to select with ease a suitable storage destination (folder) which is accessible to all email recipients and is suitable for the contents of the file.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2016-080418, filed Apr. 13, 2016, which is hereby incorporated by reference herein in its entirety.

What is claimed is:

1. A system comprising a client apparatus and a first server apparatus, wherein the client apparatus comprises:
   a first memory storing a first program; and
   a first processor in communication with the first memory, wherein the first processor executes the first program to perform:
   transmitting to the first server apparatus email information including destination email addresses of an email, a body of the email and information about a first file selected as a file to be attached;
   receiving from the first server apparatus at least one storage destination candidate for the first file;
   displaying the received at least one storage destination candidate on a display;
   storing the first file in a storage destination corresponding to a storage destination candidate selected by a user from the displayed at least one storage destination candidate; and
   transmitting to the destination email addresses an email including a link to the stored first file, and
   wherein the first server apparatus comprises:
   a second memory storing a second program; and
   a second processor in communication with the second memory, wherein the second processor executes the second program to perform:
   receiving the email information from the client apparatus;
   determining, based on the received email information, at least one storage destination which is accessible to all users corresponding to the destination email addresses and in which a second file relating to the first file and to the body of the email is stored, as the at least one storage destination candidate for the first file; and
   transmitting to the client apparatus the determined at least one storage destination candidate for the first file.

2. The system according to claim 1, wherein the first processor of the client apparatus executes the first program to further perform judging whether the first file exists in the client apparatus or in a second server apparatus, and
   wherein, in a case where the first processor judges that the first file exists in the client apparatus, the first processor transmits the email information to the first server apparatus.

3. The system according to claim 2, wherein the first processor of the client apparatus executes the first program to further perform:
   transmitting to the first server apparatus the destination email addresses and location information about a location in the second server apparatus in which the first file currently exists in a case where the first processor judges that the first file exists in the second server apparatus;
   receiving from the first server apparatus a result of judgment as to whether the location in the second server apparatus which is specified by the location information is accessible to the users corresponding to the destination email addresses; and
   transmitting to the destination email addresses the email including a link to the first file existing in the location in the second server apparatus which is specified by the location information in a case where the received result of judgment indicates that the location in the second server apparatus which is specified by the location information is accessible to the users corresponding to the destination email addresses.

4. The system according to claim 1, wherein the first processor of the client apparatus executes the first program to further perform:
   asking the user whether to generate a new storage location which is accessible to all the users corresponding to the destination email addresses in a case where there is not a storage destination which is accessible to all the users corresponding to the destination email addresses and in which the second file relating to the first file and to the body of the email is stored;
   generating the new storage location which is accessible to all the users corresponding to the destination email addresses in a case where the user selects to generate the new storage location in response to the asking;
   storing the first file in the new generated storage location; and
   transmitting to the destination email addresses the email including a link to the first file stored in the new generated storage location.

5. The system according to claim 4, wherein the first processor of the client apparatus executes the first program to further perform:
   asking the user whether to attach the first file to the email in a case where the user selects not to generate the new storage location in response to the asking; and
   transmitting to the destination email addresses the email to which the first file is attached in a case where the user selects to attach the first file to the email.

6. A client apparatus comprising:
   a memory storing a program; and
   a processor in communication with the memory, wherein the processor executes the program to perform:
   transmitting to a server apparatus email information including destination email addresses of an email, a body of the email and information about a first file selected as a file to be attached;
   receiving from the server apparatus at least one storage destination which is accessible to all users corresponding to the destination email addresses and in which a second file relating to the first file and to the body of the email is stored, as at least one storage destination candidate for the first file;
   displaying the received at least one storage destination candidate on a display;
   storing the first file in a storage destination corresponding to a storage destination candidate selected by a user from the displayed at least one storage destination candidate; and transmitting to the destination email addresses an email including a link to the stored first file.

7. A server apparatus comprising:
a memory storing a program; and
a processor in communication with the memory, wherein the processor executes the program to perform:
receiving from a client apparatus email information including destination email addresses of an email, a body of the email and information about a first file selected as a file to be attached;
determining, based on the received email information, at least one storage destination which is accessible to all users corresponding to the destination email addresses and in which a second file relating to the first file and to the body of the email is stored, as at least one storage destination candidate for the first file; and
transmitting to the client apparatus the determined at least one storage destination candidate for the first file.

8. An information processing method comprising:
transmitting to a server apparatus email information including destination email addresses of an email, a body of the email and information about a first file selected as a file to be attached;
receiving from the server apparatus at least one storage destination which is accessible to all users corresponding to the destination email addresses and in which a second file relating to the first file and to the body of the email is stored, as at least one storage destination candidate for the first file;
displaying the received at least one storage destination candidate on a display;
storing the first file in a storage destination corresponding to a storage destination candidate selected by a user from the displayed at least one storage destination candidate; and
transmitting to the destination email addresses an email including a link to the stored first file.

9. An information processing method comprising:
receiving from a client apparatus email information including destination email addresses of an email, a body of the email and information about a first file selected as a file to be attached;
determining, based on the received email information, at least one storage destination which is accessible to all users corresponding to the destination email addresses and in which a second file relating to the first file and to the body of the email is stored, as at least one storage destination candidate for the first file; and
transmitting to the client apparatus the determined at least one storage destination candidate for the first file.

10. A non-transitory computer-readable storage medium storing a program that when executed by a client apparatus causes the client apparatus to perform:
transmitting to a server apparatus email information including destination email addresses of an email, a body of the email and information about a first file selected as a file to be attached;
receiving from the server apparatus at least one storage destination which is accessible to all users corresponding to the destination email addresses and in which a second file relating to the first file and to the body of the email is stored, as at least one storage destination candidate for the first file;
displaying the received at least one storage destination candidate on a display;
storing the first file in a storage destination corresponding to a storage destination candidate selected by a user from the displayed at least one storage destination candidate; and
transmitting to the destination email addresses an email including a link to the stored first file.

11. A non-transitory computer-readable storage medium storing a program that when executed by a server apparatus causes the server apparatus to perform:
receiving from a client apparatus email information including destination email addresses of an email, a body of the email and information about a first file selected as a file to be attached;
determining, based on the received email information, at least one storage destination which is accessible to all users corresponding to the destination email addresses and in which a second file relating to the first file and to the body of the email is stored, as at least one storage destination candidate for the first file; and
transmitting to the client apparatus the determined at least one storage destination candidate for the first file.

* * * * *